US010424429B2

(12) United States Patent
Fatemi et al.

(10) Patent No.: US 10,424,429 B2
(45) Date of Patent: Sep. 24, 2019

(54) LONG STROKE LINEAR SOLENOID

(71) Applicant: GM GLOBAL TECHNOLOGY OPERATIONS LLC, Detroit, MI (US)

(72) Inventors: Alireza Fatemi, Rochester Hills, MI (US); Thomas W Nehl, Shelby Township, MI (US); Chandra S Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 102 days.

(21) Appl. No.: 15/844,671

(22) Filed: Dec. 18, 2017

(65) Prior Publication Data
US 2019/0189323 A1   Jun. 20, 2019

(51) Int. Cl.
*F16D 27/112* (2006.01)
*H01F 7/16* (2006.01)

(52) U.S. Cl.
CPC ......... *H01F 7/1653* (2013.01); *F16D 27/112* (2013.01)

(58) Field of Classification Search
CPC .. H01F 7/16; H01H 7/13; H01H 71/34; F16D 27/00–27/14; B60L 7/24–7/26; H02K 7/10–7/12
USPC ........... 335/259, 265, 267; 192/84.4–84.961; 188/161–165
See application file for complete search history.

(56) References Cited

U.S. PATENT DOCUMENTS

| 4,405,912 | A | 9/1983 | Palma et al. |
| 4,513,780 | A | 4/1985 | Evans |
| 4,540,962 | A | 9/1985 | Gresley et al. |
| 4,586,245 | A | 5/1986 | Gresley et al. |
| 4,679,593 | A | 7/1987 | Sanders |
| 4,782,862 | A | 11/1988 | Nguyen |
| 4,790,513 | A | 12/1988 | Davis et al. |
| 4,821,770 | A | 4/1989 | Parrott et al. |
| 4,830,333 | A | 5/1989 | Watson |
| 4,862,123 | A | 8/1989 | Gray et al. |
| 4,978,074 | A | 12/1990 | Weinand |
| 5,004,162 | A | 4/1991 | Stettner et al. |
| 5,353,991 | A | 10/1994 | De Nagel et al. |
| 5,603,483 | A | 2/1997 | Reuter et al. |
| 6,737,946 | B2 * | 5/2004 | Seale ............... F16K 31/0675 251/129.15 |
| 7,396,090 | B2 * | 7/2008 | Krawczyk ............... B60T 8/363 251/129.02 |
| 7,556,537 | B2 | 7/2009 | Schenk et al. |
| 7,626,288 | B2 * | 12/2009 | Protze ...................... H01F 3/14 335/209 |
| 7,688,169 | B2 * | 3/2010 | Zhao ...................... H01F 7/1607 310/12.01 |
| 7,750,772 | B2 * | 7/2010 | Hagen ................... H01F 7/1607 251/129.16 |

(Continued)

Primary Examiner — Ramon M Barrera

(57) ABSTRACT

A solenoid assembly is provided that includes male and female plungers and an electromagnetic coil configured to be energized to create a magnetic flux. Each plunger has a plunger face, where the female plunger face is configured to correspond with the male plunger face. The male plunger has a plurality of angled plunger steps that define the male plunger face, each angled plunger step including a corner having an angle in the range of 95 degrees to 115 degrees. The female plunger face has a similar, corresponding angled face. The solenoid assembly is suitable for use as a long stroke linear solenoid.

20 Claims, 4 Drawing Sheets

(56) References Cited

U.S. PATENT DOCUMENTS

| | | | |
|---|---|---|---|
| 8,053,691 B2 | 11/2011 | Vernacchia et al. | |
| 8,502,627 B1* | 8/2013 | Ahmad | H01H 3/60 335/193 |
| 9,004,883 B2 | 4/2015 | Neelakantan et al. | |
| 9,453,585 B2* | 9/2016 | Sato | F16K 31/0696 |
| 2008/0136266 A1* | 6/2008 | Protze | H01F 3/14 310/12.26 |
| 2009/0051471 A1* | 2/2009 | Zhao | H01F 7/1607 335/261 |
| 2011/0057132 A1 | 3/2011 | Lundberg et al. | |
| 2016/0123461 A1 | 5/2016 | Eber et al. | |

\* cited by examiner

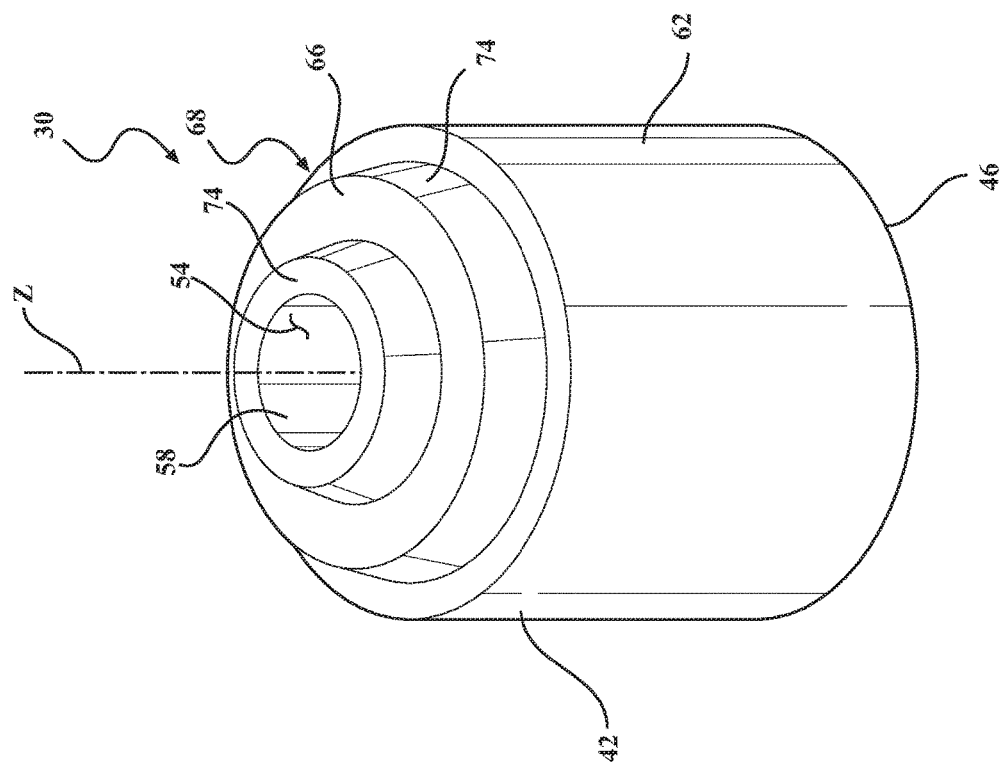
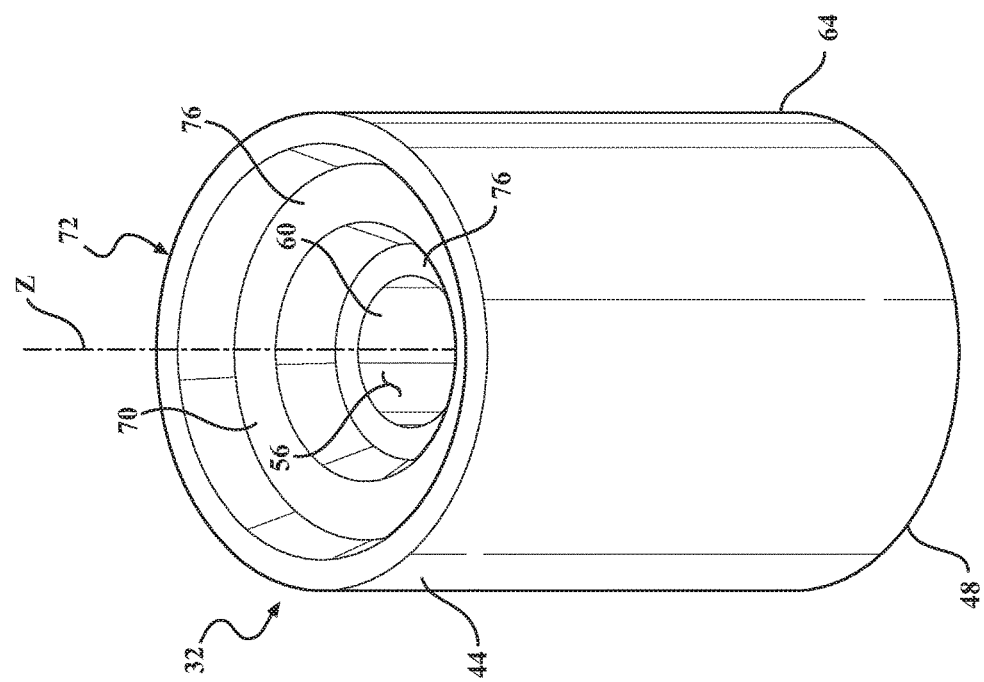

LONG STROKE LINEAR SOLENOID

FIELD

This disclosure relates generally to a solenoid assembly, and more particularly to a solenoid assembly capable of long-stroke force generation.

INTRODUCTION

Typical stepped or continuously variable transmissions employ a hydraulic control system operable to perform various functions within the transmission. These functions include actuating torque transmitting devices such as drive/reverse clutches or torque converter clutches, setting belt pulley positions, transmission cooling, and lubricating the components of the transmission. Valves and solenoids are configured to actuate the clutches and brakes. Fluid passages are formed within the valve body and connect the pump to the valves and solenoids which selectively control the supply of pressurized hydraulic fluid to the various components of the transmission. Short-stroke solenoids are typically sufficient for controlling hydraulic fluid actuation.

Other devices that use solenoid control are fuel injectors and/or diesel dosing selective catalytic reduction injectors. These types of control solenoids need only actuate along a short stroke, as well.

However, in an application where the solenoid travel distance along the stroke may need to change over time, such as due to components wearing or eroding, a short-stroke solenoid may be insufficient. Longer stroke solenoids, however, are much more difficult to design because they need to have sufficient force to provide actuation and deactuation along a large travel path.

SUMMARY

A long-stroke linear solenoid assembly is provided having a pole shape that includes a plurality of angled steps. The specific design of the pole (plunger) pieces, as well as the yoke and windings, maximizes force for a long distance stroke, such as for example, a two or four millimeter stroke.

In one aspect, which may be combined with or separate from other aspects described herein, a solenoid assembly is provided that includes an electromagnetic coil configured to be energized to create a magnetic flux. A male plunger has a male plunger face and a plurality of angled plunger steps that define the male plunger face. Each angled plunger step includes a corner having an angle in the range of 95 degrees to 115 degrees. A female plunger has a female plunger face corresponding to the male plunger face. The coil is configured to be energized to cause relative movement between the male plunger and the female plunger.

In another aspect, which may be combined with or separate from the other aspects disclosed herein, a clutch assembly of an automotive transmission is provided. The clutch assembly includes a clutch that is selectively engageable to interconnect a pair of engaging members with an independent member. A first armature is connected to a first engaging member of the pair of engaging members, and a second armature is connected to a second engaging member of the pair of engaging members. A solenoid assembly is included that has a hollow cylindrical or cubical yoke defining a yoke inner cavity. An electromagnetic coil is disposed in the yoke inner cavity and is configured to be energized to create a magnetic flux. A male plunger is disposed adjacent to the electromagnetic coil. The male plunger has a male plunger face and a plurality of angled plunger steps that define the male plunger face. Each angled plunger step includes a corner having an angle in the range of 95 degrees to 115 degrees. The male plunger has a distal end extending from the yoke that is connected to the first armature. A female plunger is also disposed adjacent to the electromagnetic coil, the female plunger having a female plunger face corresponding to the male plunger face. The female plunger has a distal end extending from the yoke that is connected to the second armature. The electromagnetic coil is configured to be energized to cause relative movement between the male plunger and the female plunger and between the independent member and the pair of engaging members.

Further additional features may be provided, including but not limited to the following: wherein the angle of each corner of each angled plunger step is in the range of 100 degrees to 110 degrees; an effective solenoid stroke being a maximum distance of displacement between the male plunger and the female plunger; wherein a ratio between a height of each angled plunger step and the effective solenoid stroke is in a range of 0.75 to 1.25; the male plunger being cylindrical and having an inner cylindrical surface defining an aperture through the male plunger along a central axis; the male plunger having an outer cylindrical surface disposed about the inner cylindrical surface; a cross-section of the male plunger being a surface of rotation that is rotated about the central axis to define the male plunger; the male plunger having an inner flat surface extending from the inner cylindrical surface to the corner of an inner step of the plurality of steps; a flat step surface separating each step; an outer flat surface extending from the outer cylindrical surface to the corner of an outer step of the plurality of steps; wherein the inner flat surface, the outer flat surface, and/or the flat step surface(s) are perpendicular to the axis of rotation; the inner flat surface having an inner flat surface width; the outer flat surface having an outer flat surface width; the male plunger having a plunger section width extending from the inner cylindrical surface to the outer cylindrical surface; a ratio of the inner flat surface width to the plunger section width being in the range of 0.1 to 0.2; and a ratio of the outer flat surface width to the plunger section width being in the range of 0.1 to 0.2.

Further additional features may be provided, including but not limited to the following: a hollow cylindrical yoke surrounding the electromagnetic coil and center portions of the male plunger and the female plunger; the solenoid assembly having a half-width extending from the inner cylindrical surface of the male plunger to a yoke outer cylindrical surface; a ratio of the plunger section width to the half-width being in the range of 0.40 to 0.55; the yoke defining a yoke inner cavity having an inner cylindrical surface; the electromagnetic coil being disposed in the yoke inner cavity; the yoke defining a yoke section width extending from the inner cylindrical surface of the yoke to the yoke outer cylindrical surface; a ratio of the yoke section width to the half-width being in the range of 0.05 to 0.15; the yoke inner cavity having an inner annular end edge and an outer annular end edge; the yoke defining a yoke half-height from a center of the yoke to the outer annular end edge of the yoke; the yoke defining a yoke edge height from the inner annular end edge to the outer annular end edge of the yoke; a ratio of the yoke edge height to the yoke half-height being in the range of 0.10 to 0.20; the solenoid assembly being normally open such that the male plunger is disposed at a distance of the effective stroke distance from the female plunger in a deenergized state of the electromagnetic coil; a bobbin defining an inner bobbin cavity about which the electromagnetic coil is wound; the bobbin being disposed within the yoke inner cavity; wherein the solenoid assembly is a linear force solenoid; the solenoid assembly being configured such a travel distance between the male plunger and the female plunger may increase over time; the effective solenoid stroke being configured to be at least two millimeters; and wherein energization of the electromagnetic coil is configured to cause the male plunger and the female plunger to be disposed in a stroked position.

Further additional features may also be provided, including but not limited to the following: the clutch being engaged and interconnecting the pair of engaging members with the independent member when the male plunger and the female plunger are in the stroked position; each plunger being cylindrical and defining an aperture therethrough along a central axis; each plunger having an inner cylindrical surface and an outer cylindrical surface disposed about the inner cylindrical surface; each of the inner cylindrical surface and the outer cylindrical surface being disposed about the central axis; and the cross-section of each plunger being a surface of rotation that is rotated about the central axis to define each plunger.

Further aspects and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3A is a perspective view of a male plunger of the solenoid assembly of FIGS. 1-2, in accordance with the principles of the present disclosure;

FIG. 3B is a perspective view of a female plunger of the solenoid assembly of FIGS. 1-2, according to the principles of the present disclosure.

DETAILED DESCRIPTION

The following description is merely exemplary in nature and is not intended to limit the present disclosure, its application, or its uses.

Figure 1:
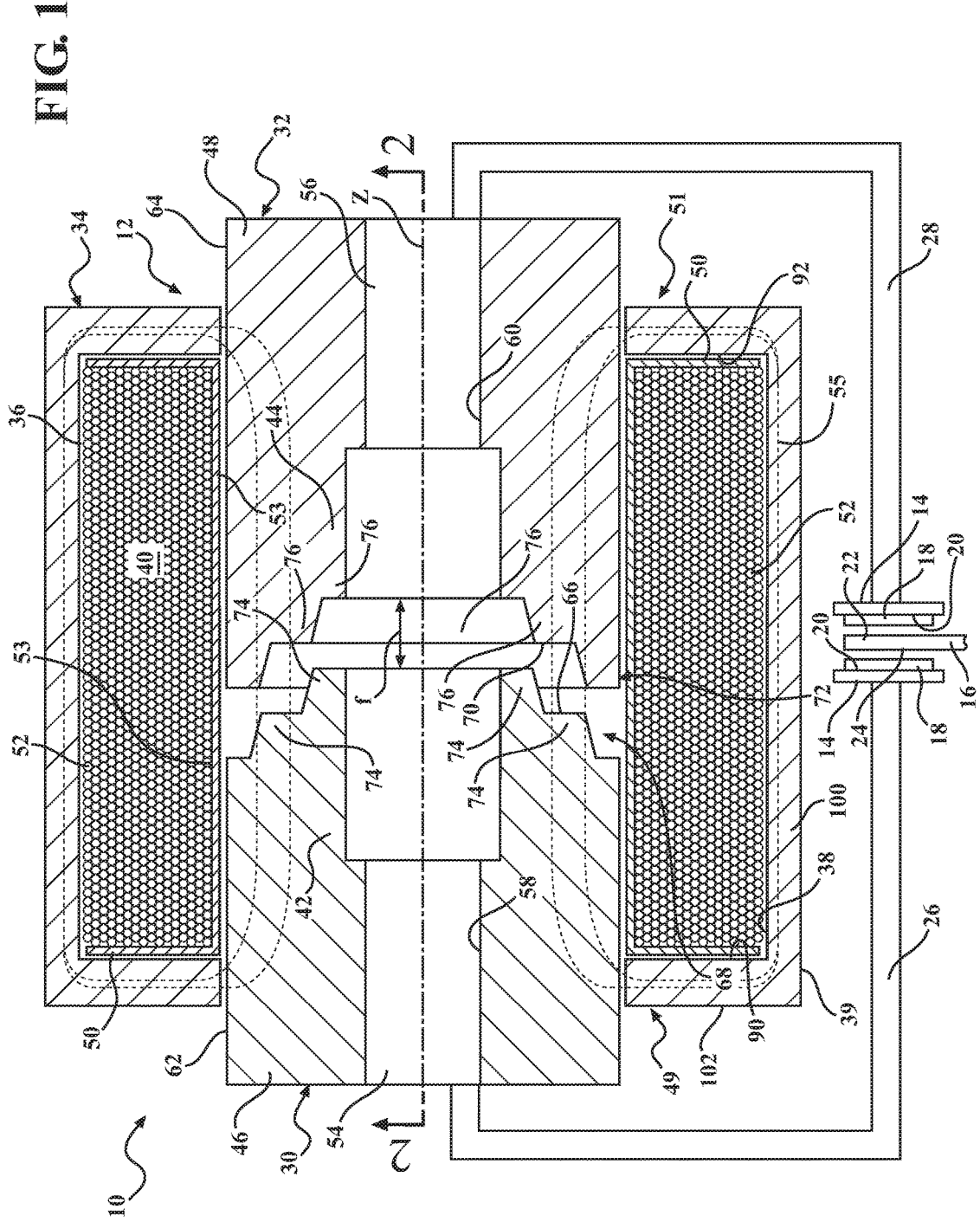
FIG. 1 is a cross-sectional view of a clutch assembly including a solenoid assembly in a destroked position, in accordance with the principles of the present disclosure.

With reference to FIG. 1, a clutch assembly for use in a transmission (not shown) of a motor vehicle (not shown) is illustrated and generally indicated by reference number 10. The clutch assembly 10 is actuated by a solenoid assembly 12. The clutch assembly 10 is merely one non-limiting example of an application for the solenoid assembly 12, and it should be understood that the solenoid assembly 12 has use in various different applications, as well.

The clutch assembly 10, in this example, includes a pair of engaging members, such as apply plates 14 that are selectively engageable with an independent member, such as a reaction plate 16. A force may be applied to the apply plates 14 to bring the apply plates closer to each other and squeeze the apply plates 14 against the reaction plate 16. When the apply plates 14 are engaged with the reaction plate 16, the apply plates 14 and the reaction plate 16 rotate together. When the apply plates 14 are disengaged from the reaction plate 16, the apply plates 14 rotate independently from the reaction plate 16. In some examples, the clutch assembly 10 may be a brake system, wherein either the apply plates 14 or the reaction plate 16 are rotationally stationary so that they do not rotate. For example, the apply plates 14 may be fixed to a vehicle stationary structure through the solenoid assembly 12 so that the apply plates 14 are configured to brake the reaction plate 16 when coupled together therewith.

To engage the reaction plate 16, the apply plates 14 may each have friction material 18 disposed an inner face 20 of the apply plate 14. In addition, or in the alternative, the reaction plate 16 could have friction material disposed on one or both of its faces 22, 24. The friction material 18 may wear down or erode over time, which will be explained in greater detail below.

A first armature 26 is connected to one of the apply plates 14, and a second armature 28 is connected to the other apply plate 14, in the illustrated example. The solenoid assembly 12 includes first and second pole pieces, or male and female plungers 30, 32, each of which is fixedly connected to one of the armatures 26, 28.

Referring to FIGS. 2, 3A-3B, and 4, with continued reference to FIG. 1, the solenoid assembly 12 further includes a hollow cylindrical or cubical housing or yoke 34 that defines a yoke inner cavity 36, where an inner cylindrical or cubical surface 38 forms the boundary of the yoke inner cavity 36. The yoke 34 has an outer cylindrical or cubical surface 39 surrounding the inner cylindrical or cubical surface 38. An electromagnetic coil 40 is disposed within the yoke inner cavity 36. Center portions 42, 44 of each of the plungers 30, 32 are disposed adjacent to the electromagnetic coil 40, and distal end portions 46, 48 of each of the plungers 30, 32 extend out of the ends 49, 51 of the yoke 34. The yoke 34 surrounds the electromagnetic coil 40 and the center portions 42, 44 of the plungers 30, 32.

The coil 40 may be disposed about or wrapped around an inner surface 53 of a sleeve or bobbin 50 disposed within the yoke 34. The inner surface 53 of the bobbin 50 defines an inner cavity 52 of the bobbin 50 in which the coil 40 is disposed. The bobbin 50 is disposed within the yoke inner cavity 36, so that the coil 40 is essentially enclosed between the yoke 34 and the bobbin 50. The inner surface of the bobbin 50 has a smooth surface with minimum static and dynamic friction to facilitate the movement of the male and female plungers. The coil 40 is enclosed and protected by the yoke 34 (and by the bobbin 50). The coil 40 may be connected to a connector port (not shown) that is interconnected to an electronic transmission control module (ETCM), another type of controller such as an engine controller, a hybrid controller, a body controller, etc., or to another power source.

The electromagnetic coil 40 is configured to be energized to create a magnetic flux 55 through the coil 40 and the plungers 30, 32. Upon being energized, the electromagnetic coil 40 is configured to cause relative movement between the male plunger 30 and the female plunger 32 because of the magnetic flux 55 that the coil 40 creates. The plungers 30, 32 move in a linear direction along the central axis Z.

The plungers 30, 32 stroke from a closest distance position between the male plunger 30 and the female plunger 32 and a farthest distance position between the male plunger 30 and the female plunger 32. The maximum distance that the plungers can stroke away from each other is called the effective solenoid stroke. The effective solenoid stroke may be determined based on a predetermined force requirement to bring the plungers 30, 32 back together or toward each other. In other words, the effective solenoid stroke can be designed to be any distance so long as a predetermined force be achieved between the plungers 30, 32 upon energization. At some point, if the stroke is too long, the plungers 30, 32 cannot be moved with enough force to move toward each other and/or to bring apply plates 14 toward the reaction plate 16, or to overcome a spring force (when a spring is included to bias the plungers 30, 32 apart).

In FIG. 1, the clutch assembly 10 is disengaged and the plungers 30, 32 are in the farthest distance position from each other, with a gap f therebetween. The gap f represents the gap between the male plunger 30 and the female plunger 32 when the plungers 30, 32 are in the farthest or maximum distance position from each other, which may be equal to the effective solenoid stroke. In the illustrated example, the solenoid assembly 12 is normally open such that the plungers 30, 32 are in the farthest distance position, with a gap f therebetween, when the coil 40 is deenergized, and the clutch plates 14, 16 are disengaged.

Upon energization of the coil 40, one or both of the plungers 30, 32 move toward each other until the apply plates 14 and the reaction plate 16 are engaged, so that the plungers 30, 32 are in a stroked position. The gap f between the plungers 30, 32 decreases when the coil 40 is energized and the plungers 30, 32 are in the stroked position. Thus, energization of the electromagnetic coil 40 is configured to cause the male plunger 30 and the female plunger 32 to be disposed closer together in the stroked position. When the plungers 30, 32 are in the stroked position, the clutch 10 is engaged and the pair of apply plates 14 are interconnected with the reaction plate 16.

Each plunger 30, 32 is cylindrical and defines an aperture 54, 56 therethrough along a central axis Z. A spring (not shown) may be disposed in the apertures 54, 56 to bias the plungers 30, 32 apart into the normally open position, if desired. Each plunger 30, 32 has an inner cylindrical surface 58, 60 and an outer cylindrical surface 62, 64 disposed about the inner cylindrical surface 58, 60. The inner cylindrical surface 58 and the outer cylindrical surface 62 of the male plunger 30 are disposed about the central axis Z, and the inner cylindrical surface 60 and the outer cylindrical surface 64 of the female plunger 32 are disposed about the central axis Z. The cross-section of each plunger 30, 32 is a surface of rotation that is rotated about the central axis Z to define each plunger 30, 32. Thus, the plungers 30, 32 are symmetric about the central axis Z, in this example.

The male plunger 30 has a male plunger face 66 disposed at a proximal end 68 of the male plunger 30. The female plunger 32 has a female plunger face 70 disposed at a proximal end 72 of the female plunger 32. The plungers 66, 70 move closer to each other, and may even contact each other in some variations, when the coil 40 is energized to move the plungers 30, 32 into a stroked position.

The male plunger 30 has a plurality of angled plunger steps 74 that define the male plunger face 66. The female plunger face 70 corresponds to the male plunger face 66. Thus, the female plunger 32 has a plurality of angled plunger steps 76 that define the female plunger face 70 and that are disposed opposite of the steps 74 of the male plunger face 66. In the illustrated example, there are two steps 74 formed in the male plunger face 66, but it should be appreciated that any desirable number of plunger steps 74 could be used, such as three or more.

Figure 4:
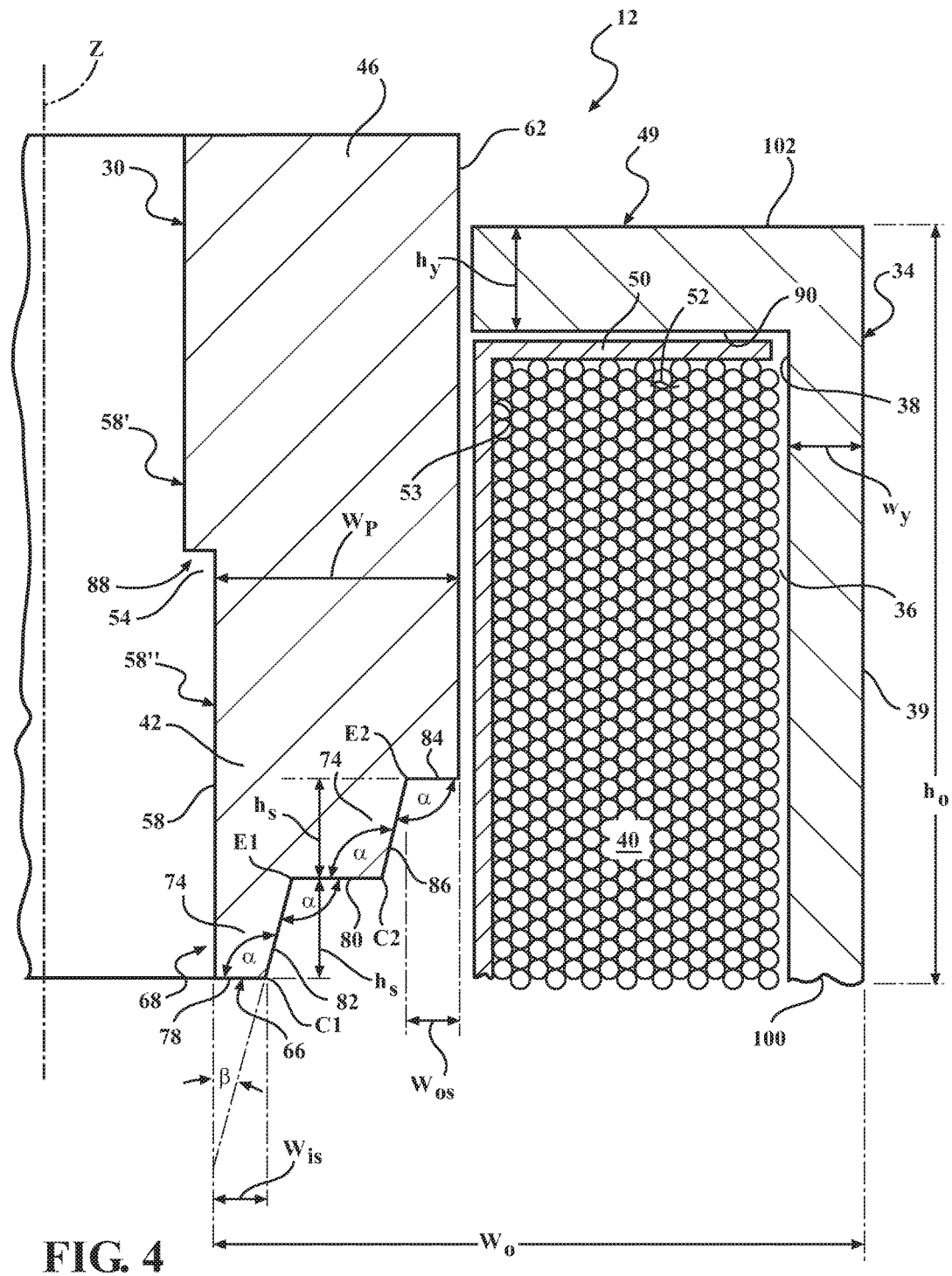
FIG. 4 is a cross-sectional view of a portion of the solenoid assembly of FIGS. 1-2, according to the principles of the present disclosure.

Referring now to FIG. 4, each angled plunger step 74 includes a convex corner C1, C2 having an angle α in the range of 95 degrees to 115 degrees. More preferably, the angle α is in the range of 100 degrees to 110 degrees. The angles α of each convex corner C1, C2 may be equal to each other in magnitude, or in the alternative, each convex corner C1, C2 of the steps 74 of the male plunger 30 need not have equal angles. Though the angles α are shown and described with respect to the male plunger 30 in FIG. 4, it should be understood that the female plunger 32 can have equal and opposite steps 76 having corresponding angles, as can be seen in the other figures.

The male plunger 30 has an inner flat surface 78 extending from the inner cylindrical surface 58 to a first convex corner C1 of an inner step 74 of the plurality of steps 74. A tapered surface 82 extends from the convex corner C1 to a concave corner E1, thereby connecting the inner flat 78 to a flat step surface 80. An outer flat surface 84 extends from the outer cylindrical surface 62 to a second concave corner E2 of an outer step 74 of the plurality of steps 74. A tapered surface 86 connects the outer flat surface 84 to the flat step surface 80 at a second concave corner C2. In this example, the inner flat surface 78, the outer flat surface 84, and the flat step surface 80 are perpendicular to the axis of rotation X. Each tapered surface 82, 86 is disposed at an angle β with respect to the central axis Z, where β is equal to 90 minus α. (β is illustrated in FIG. 4 along a line that is perpendicular to the axis of rotation Z for purposes of ease of illustration). The concave corners E1, E2 may define angles α, as shown, that are equal to the angles α of the concave corners C1, C2. In one variation, the ratio between the height $h_s$ of each angled plunger step and the effective solenoid stroke is in the range of 0.75 to 1.25.

The inner flat surface 78 has an inner flat surface width $w_{is}$, and the outer flat surface 84 has an outer flat surface width $w_{os}$. The male plunger 30 has a plunger section width $w_p$, which may extend from the inner cylindrical surface 58 to the outer cylindrical surface 62 of the male plunger 30. In this particular example, the inner cylindrical surface 58 has a step 88 in the inner cylindrical surface 58 to accommodate a spring (not shown). The plunger section width $w_p$ can be measured from either the outer part 58' of the inner cylindrical surface 58 or from the inner part 58" of the inner cylindrical surface 58. In some cases, the aperture 54 may not extend through the entire male plunger 30, in which case the plunger section width $w_p$ could be measured from the central axis Z, or midpoint, of the plunger cross-section. In some variations, a ratio of the inner flat surface width $w_{is}$ to the plunger section width $w_p$ is in the range of 0.1 to 0.2. Similarly, a ratio of the outer flat surface width $w_{os}$ to the plunger section width $w_p$ may be in the range of 0.1 to 0.2.

The solenoid assembly 12 has a half-width $w_o$ extending from the inner cylindrical surface 58 (either 58' or 58") of the male plunger 30 to the yoke outer cylindrical surface 39. In other variations, where the aperture 54 does not extend through the male plunger 30, the half-width $w_o$ could be measured from a center of the male plunger 30, such as along the central axis Z. In some variations, a ratio of the plunger width $w_p$ to the half-width $w_o$ is in the range of 0.40 to 0.55.

The yoke 34 defines a yoke section width $w_y$ extending from the inner cylindrical surface 38 of the yoke 34 to the outer cylindrical surface 39 of the yoke 34. In some variations, a ratio of the yoke section width $w_y$ to the half-width $w_o$ of the solenoid assembly 12 is in the range of 0.05 to 0.15.

The yoke inner cavity 36 has an inner annular end edge 90 (shown in FIGS. 1 and 4) on the inside of the first end 49 of the yoke 34 and an inner annular end edge 92 on the inside of the second end 51 of the yoke 34 (shown in FIG. 1). The yoke 34 defines a yoke half-height $h_o$ measured from a center 100 of the yoke 34 to an end 49, or an outer annular end edge 102, of the yoke 34. The yoke 34 defines a yoke edge height by measured from the inner annular end edge 90 to the outer annular end edge 102 disposed at the end 49 of the yoke 34. In some variations, a ratio of the yoke edge height $h_y$ to the yoke half-height $h_o$ is in the range of 0.10 to 0.20.

A summary of the ratios described above are included in Table 1. The effective solenoid stroke is indicated by $l_s$ in Table 1. Again, α is the angle of each convex corner C1, C2 of each angled plunger step 74; and a can also be said to be the angle between the inner flat surface 78 and the tapered surface 82, or the angle between the flat step surface 80 and the tapered surface 86. The other parameters in Table 1 are defined as follows: $h_s$ is the height of each step 74; $w_{os}$ is the width of the outer flat surface 84; $w_p$ is the plunger width between the inner cylindrical surface 58 (which may be measured from 58' or 58") and the outer cylindrical surface 62; $w_{is}$ is the width of the inner flat surface 78; $w_o$ is the solenoid assembly half-width between the inner cylindrical surface 58 (which may be measured from 58' or 58") and the yoke outer cylinder surface 39; $w_y$ is the yoke section width extending from the inner cylindrical surface 38 of the yoke 34 to the outer cylindrical surface 39 of the yoke 34; $h_y$ is the yoke edge height measured from the inner annular end edge 90 to the outer annular end edge 102; and $h_o$ is the yoke half-height $h_o$ measured from a center 100 of the yoke 34 to an end 49, or an outer annular end edge 102, of the yoke 34.

TABLE 1

Optimal ranges for parameters or ratios of parameters.

| Parameters | Optimal Range |
|---|---|
| α | 95-115 degrees |
|  | 100-110 degrees |
| $h_s/l_s$ | 0.75-1.25 |
| $w_{os}/w_p$ | 0.10-0.20 |
| $w_{is}/w_p$ | 0.10-0.20 |
| $w_p/w_o$ | 0.40-0.55 |
| $w_y/w_o$ | 0.05-0.15 |
| $h_y/h_o$ | 0.10-0.20 |

The distance between the plungers 30, 32 is the gap f at the farthest distance position (at the length of the effective solenoid stroke), and the distance between the plungers 30, 32 becomes f minus the travel distance at the closest distance position of the plungers 30, 32 when the clutch 10 is engaged.

The solenoid assembly 12 is configured such that the distance the plungers 30, 32 travel along the effective solenoid stroke $l_s$ may increase over time. For example, when the apply plates 14 are new, the friction material 18 has a certain thickness. When the clutch 10 is engaged, because the apply plates 14 are new with new friction material 18, a certain distance will be traveled by the plungers 30, 32 until the apply plates 14 and the reaction plate 16 are fully engaged.

In some examples, the distance traveled to engage the clutch 10 when the parts are new could be at least two millimeters, such that the plunger faces 66, 70 are distance apart off minus 2 mm when stroked, when the parts are new. As the friction material 18 wears down over time, the plungers 30, 32 will need to travel closer together when energized to accomplish the engagement of the apply plates 14 with the reaction plate 16. When the friction material 18 is worn down, it takes up less space. Thus, with a worn-down friction material 18, the distance traveled by the plungers 30, 32 could be at least two millimeters, and the plungers 30, 32 may even contact each other at their faces 66, 70 when stroked. Therefore, in this example, the distance between the plungers 30, 32 is the gap f when destroked, and the distance between the plungers 30, 32 is f minus 4 mm in the stroked position of the plungers 30, 32 when the parts are used and worn. If the gap f is equal to 4 mm (e.g., the effective solenoid stroke is 4 mm), then the distance between the plungers 30, 32 when stroked would be zero and the faces 66, 70 would be in contact with each other. Accordingly, the travel distance of the plungers 30, 32 may be configured to be at least one millimeter at a first time and at least two millimeters at a second time, where the second time is after the first time. This example applies to a normally open solenoid configuration; it should be understood that the same principles could be applied to describe a normally closed solenoid, except that the plungers 30, 32 would move farther apart when stroked.

Although the dimensions and details are described for the male plunger 30 and plunger face 66, it should be understood that the female plunger 32 may have equal and opposite features such that the female plunger face 72 can contact and mate with the male plunger face 66.

The tapered profile of the steps 74, including the tapered surfaces 82, 86 exhibited a high force between the faces 66, 72 at the longest strokes.

In some forms, the yoke 34 and the plungers 30, 32 may be made of steel (such as cold rolled carbon steel 1008-1020 grade), iron, or another ferro-magnetic material. The coil 40 may be made of copper windings, for example, having a gauge AWG 18-24, with a total number of turns between 100 and 600. The bobbin 50 could be made of brass or bronze for reduced contact friction. An excitation voltage of 12-48 Volts could be used, with an excitation current of 1-10 Amps.

Figure 2:
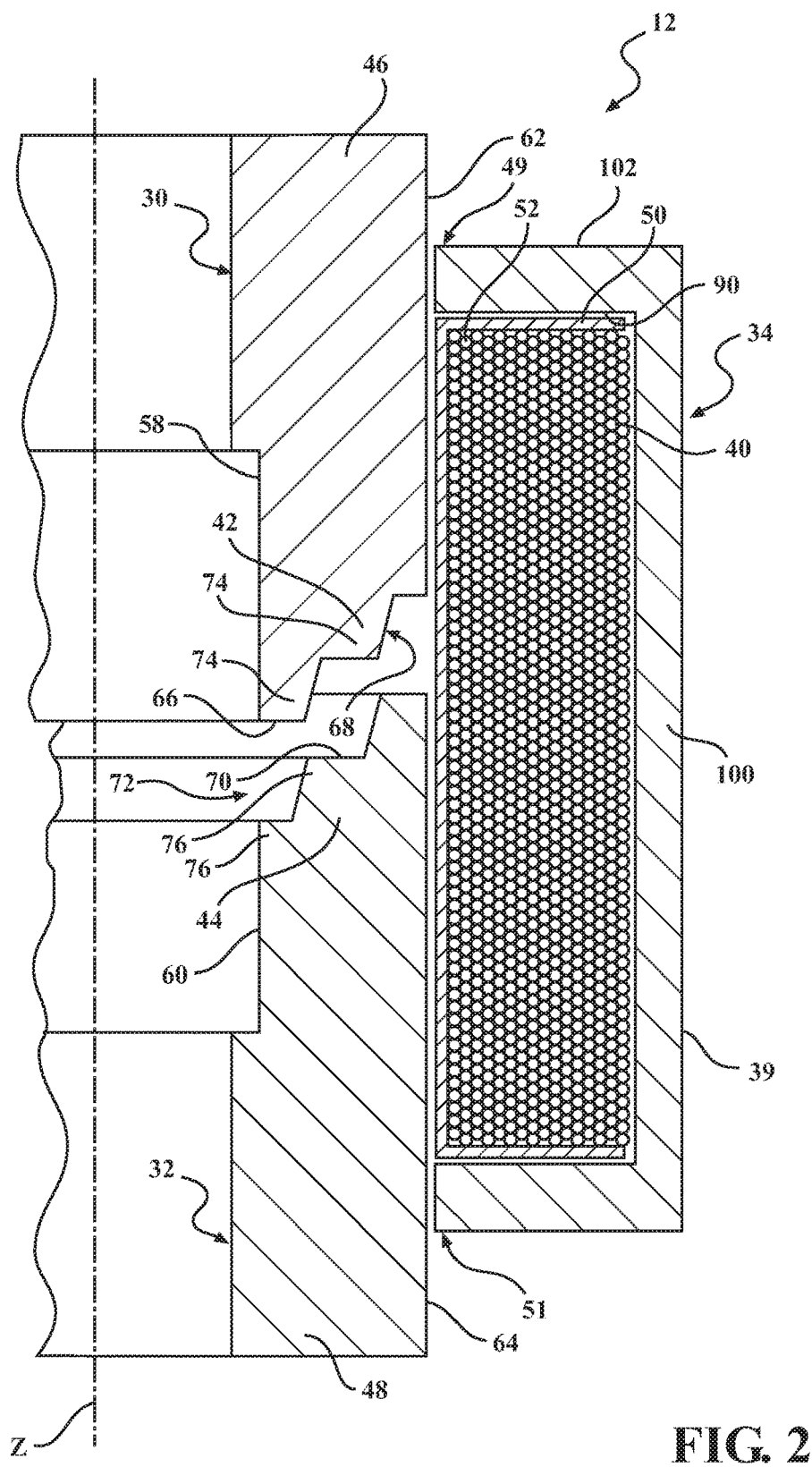
FIG. 2 is a cross-sectional view of a portion of the solenoid assembly of FIG. 1, according to the principles of the present disclosure.

Each plunger 30, 32 may have a two-dimensional profile, as shown in FIGS. 1, 2, and 4, which can be manufactured easily, such as with a lathe.

The description is merely exemplary in nature and variations that do not depart from the gist are intended to be within the scope of this disclosure. Such variations are not to be regarded as a departure from the spirit and scope of the invention, as defined in the appended claims.

What is claimed is:

1. A solenoid assembly comprising:
   an electromagnetic coil configured to be energized to create a magnetic flux;
   a male plunger having a male plunger face, the male plunger having a plurality of angled plunger steps that define the male plunger face, each angled plunger step including a corner having an angle in the range of 95 degrees to 115 degrees;
   a female plunger having a female plunger face corresponding to the male plunger face,
   wherein the electromagnetic coil is configured to be energized to cause relative movement between the male plunger and the female plunger.

2. The solenoid assembly of claim 1, wherein the angle of each corner of each angled plunger step is in the range of 100 degrees to 110 degrees.

3. The solenoid assembly of claim 2, wherein a ratio between a height of each angled plunger step and an effective solenoid stroke is in a range of 0.75 to 1.25, the effective solenoid stroke being a maximum distance of displacement between the male plunger and the female plunger.

4. The solenoid assembly of claim 3, a cross-section of the male plunger being a surface of rotation that is rotated about the central axis to define the male plunger.

5. The solenoid assembly of claim 4, the male plunger being cylindrical and having an inner cylindrical surface defining an aperture through the male plunger along a central axis, the male plunger having an outer cylindrical surface disposed about the inner cylindrical surface, the male plunger having an inner flat surface extending from the inner cylindrical surface to a corner of an inner step of the plurality of steps, the male plunger having at least one flat step surface, wherein each step is separated by the at least one flat step surface, and the male plunger having an outer flat surface extending from the outer cylindrical surface to the a corner of an outer step of the plurality of steps, wherein the inner flat surface, the outer flat surface, and the at least one flat step surface are perpendicular to the axis of rotation.

6. The solenoid assembly of claim 5, the inner flat surface having an inner flat surface width, the outer flat surface having an outer flat surface width, and the male plunger having a plunger section width extending from the inner cylindrical surface to the outer cylindrical surface, a ratio of the inner flat surface width to the plunger section width being in the range of 0.1 to 0.2, and a ratio of the outer flat surface width to the plunger section width being in the range of 0.1 to 0.2.

7. The solenoid assembly of claim 6, further comprising a hollow yoke surrounding the electromagnetic coil and center portions of the male plunger and the female plunger.

8. The solenoid assembly of claim 7, the solenoid assembly having a half-width extending from the inner cylindrical surface of the male plunger to a yoke outer cylindrical surface of the yoke, a ratio of the plunger section width to the half-width being in the range of 0.40 to 0.55.

9. The solenoid assembly of claim 8, the yoke having a yoke inner cylindrical surface defining a yoke inner cavity, the electromagnetic coil being disposed in the yoke inner cavity.

10. The solenoid assembly of claim 9, the yoke having a yoke section width extending from the yoke inner cylindrical surface to the yoke outer cylindrical surface, a ratio of the yoke section width to the half-width being in the range of 0.05 to 0.15.

11. The solenoid assembly of claim 10, the yoke having an inner annular end edge and an outer annular end edge further defining the yoke inner cavity, the yoke having a yoke half-height extending from a center of the yoke to the outer annular end edge of the yoke, the yoke having a yoke edge height extending from the inner annular end edge to the outer annular end edge of the yoke, a ratio of the yoke edge height to the yoke half-height being in the range of 0.10 to 0.20.

12. The solenoid assembly of claim 11, the solenoid assembly being normally open such that the male plunger is disposed at a distance of the effective solenoid stroke from the female plunger in a deenergized state of the electromagnetic coil.

13. The solenoid assembly of claim 12, further comprising a bobbin defining an inner bobbin cavity about which the electromagnetic coil is wound, the bobbin being disposed within the yoke inner cavity.

14. The solenoid assembly of claim 13 wherein the solenoid assembly is a linear force solenoid.

15. The solenoid assembly of claim 14, the solenoid assembly being configured such that a travel distance of the male plunger may increase over time.

16. The solenoid assembly of claim 15, wherein the effective solenoid stroke is configured to be at least two millimeters.

17. A clutch assembly of an automotive transmission, the clutch assembly comprising:
a clutch being selectively engageable to interconnect a pair of engaging members with an independent member;
a first armature connected to a first engaging member of the pair of engaging members;
a second armature connected to a second engaging member of the pair of engaging members; and
a solenoid assembly comprising:
a hollow cylindrical yoke defining a yoke inner cavity;
an electromagnetic coil configured to be energized to create a magnetic flux, the electromagnetic coil being disposed in the yoke inner cavity;
a male plunger disposed adjacent to the electromagnetic coil, the male plunger having a male plunger face, the male plunger having a plurality of angled plunger steps that define the male plunger face, each angled plunger step including a corner having an angle in the range of 95 degrees to 115 degrees, the male plunger having a distal end extending from the yoke and connected to the first armature; and
a female plunger disposed adjacent to the electromagnetic coil, the female plunger having a female plunger face corresponding to the male plunger face, the female plunger having a distal end extending from the yoke and connected to the second armature,
wherein the electromagnetic coil is configured to be energized to cause relative movement between the male plunger and the female plunger.

18. The clutch assembly of claim 17, wherein energization of the electromagnetic coil is configured to cause the male plunger and the female plunger to move toward each other in a stroked position, the clutch being engaged and interconnecting the pair of engaging members with the independent member when the male plunger and the female plunger are in the stroked position.

19. The clutch assembly of claim 18, each plunger being cylindrical and defining an aperture therethrough along a central axis, each plunger having an inner cylindrical surface and an outer cylindrical surface disposed about the inner cylindrical surface, each of the inner cylindrical surface and the outer cylindrical surface being disposed about the central axis, a cross-section of each plunger being a surface of rotation that is rotated about the central axis to define each plunger, the male plunger having an inner flat surface extending from the inner cylindrical surface to a corner of an inner step of the plurality of steps, an outer flat surface extending from the outer cylindrical surface to a corner of an outer step of the plurality of steps, and a flat step surface disposed between the inner flat surface and the outer flat surface, and wherein the inner flat surface, the outer flat surface, and the flat step surface are perpendicular to the axis of rotation, the solenoid assembly being normally open such that the male plunger is disposed a distance of an effective solenoid stroke from the female plunger in a deenergized state of the electromagnetic coil, the effective solenoid stroke being a maximum distance of displacement between the male plunger and the female plunger.

20. The clutch assembly of claim 19, wherein:

the angle of each corner of each angled plunger step is in the range of 100 degrees to 110 degrees;

a ratio between a height of each angled plunger step and the effective solenoid stroke is in a range of 0.75 to 1.25;

the inner flat surface has an inner flat surface width, the outer flat surface has an outer flat surface width, and the male plunger has a plunger section width extending from the inner cylindrical surface to the outer cylindrical surface of the male plunger, a ratio of the inner flat surface width to the plunger section width being in the range of 0.1 to 0.2;

a ratio of the outer flat surface width to the plunger section width is in the range of 0.1 to 0.2;

the solenoid assembly has a half-width extending from the inner cylindrical surface of the male plunger to a yoke outer cylindrical surface, a ratio of the plunger section width to the half-width being in the range of 0.40 to 0.55;

the yoke has a yoke inner cylindrical surface that defines the yoke inner cavity, the yoke defining a yoke section width extending from the yoke inner cylindrical surface to the yoke outer cylindrical surface, a ratio of the yoke section width to the half-width being in the range of 0.05 to 0.15;

the yoke has an inner annular end edge and an outer annular end edge further defining the yoke inner cavity, the yoke having a yoke half-height extending from a center of the yoke to the outer annular end edge of the yoke, the yoke having a yoke edge height extending from the inner annular end edge to the outer annular end edge of the yoke, a ratio of the yoke edge height to the yoke half-height being in the range of 0.10 to 0.20; and the solenoid assembly is configured such that a travel distance of the male plunger may increase over time, the effective solenoid stroke being configured to be at least two millimeters.

* * * * *